(12) United States Patent
Boyle

(10) Patent No.: US 6,807,401 B2
(45) Date of Patent: Oct. 19, 2004

(54) ANTENNA DIVERSITY ARRANGEMENT

(75) Inventor: Kevin R. Boyle, Horsham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 616 days.

(21) Appl. No.: 09/814,383

(22) Filed: Mar. 21, 2001

(65) Prior Publication Data
US 2004/0014432 A1 Jan. 22, 2004

(30) Foreign Application Priority Data
Mar. 23, 2000 (GB) .............................. 0006955

(51) Int. Cl.⁷ ................................ H04B 1/02
(52) U.S. Cl. .................... 455/101; 455/562.1; 375/267; 375/299
(58) Field of Search ................. 455/101, 102, 455/103, 272, 562.1, 276.1; 375/267, 299; 343/702, 729

(56) References Cited

U.S. PATENT DOCUMENTS 5,977,916 A * 11/1999 Vannatta et al. ............ 343/702
6,658,269 B1 * 12/2003 Golemon et al. ........... 370/315

FOREIGN PATENT DOCUMENTS

WO    WO9955012    10/1999

OTHER PUBLICATIONS

By R.J. Clarke, Entitled: "A Statistical Theory of Mobile–Radio Reception" Bell Systems Technical Journal, vol. 47 No. 6, pp 957–1000.
By J.M. Westberg, Entitled: "Matrix Method for Relating Base Current Ratios to Field Ratios of AM Directional Stations", IEEE Transactions on Broadcasting, vol. 35 No. 2, pp. 172 to 175.
Tsunekawa et al., "Analysis of a correlation coefficient of built–in diversity antennas for a portable telephone," Nov. 5, 1990, pp. 543–546.

* cited by examiner

Primary Examiner—Lee Nguyen
(74) Attorney, Agent, or Firm—Dicran Halajian

(57) ABSTRACT

An antenna diversity arrangement (200) comprises a plurality of antennas (204a, 204b) capable of forming a plurality of antenna beams. The amplitude and phase relationships between the signals driving each of the antennas (204a, 204b) are first determined for an arrangement where each antenna is replaced by a point source. The results of this analysis are then transformed by reference to the characteristics of the real antenna arrangement (200) to determine appropriate driving signals.

The resultant antenna diversity arrangements (200) can have antennas (204a, 204b) located arbitrarily close to one another with near-zero correlation between any pair of the antenna beams, thereby providing a compact and effective arrangement.

20 Claims, 5 Drawing Sheets

ANTENNA DIVERSITY ARRANGEMENT

The present invention relates to an antenna diversity arrangement comprising a plurality of antennas for providing angular diversity, and further relates to a wireless device incorporating such an antenna diversity arrangement and to a method of operating such an arrangement.

Antenna diversity is a well-known technique for mitigating the effects of multipath propagation in a radio communication system. When the signals received by two (or more) antennas are sufficiently decorrelated it has been shown that narrowband diversity gains of approximately 10 dB can be achieved.

The spatial correlation of fields in a mobile radio environment was studied in *A Statistical Theory of Mobile-Radio Reception*, R. J. Clarke, Bell Systems Technical Journal, Volume 47 No. 6, pages 957 to 1000. In this paper the well-known formula for the spatial envelope auto-correlation coefficient $\rho_e$ of a received vertically polarised wave was shown to be given by $$\rho_e = |\rho|^2 = J_0(kx) \tag{1}$$

where $\rho$ is the auto-correlation coefficient of the magnitude of the electric field, k is the wavenumber and x is the distance. This function is plotted in FIG. 1.

In communication systems that employ diversity, such as DECT (Digital Enhanced Cordless Telecommunications), it is conventional to employ two antennas to provide spatial diversity. Each antenna is designed to be omni-directional (at least for a cellular system employing substantially circular cells) and independent of the other antenna. This is achieved by separating the antennas by a large distance (which is required for good spatial decorrelation, as can be seen from FIG. 1) and, if necessary, by detuning the unused antenna. However, the large separation between the antennas places restrictions on the equipment size. Further, the potential of a dual antenna system to achieve array gain (or directivity) is not realised.

By considering the antennas as an array, an angular diversity system can be designed in which a plurality of beams are generated from a plurality of antennas. The directivity of the beams provides enhanced coverage while reducing delay spread (because of the reduced angular range over which signals are transmitted) The use of array gain enhances coverage, thereby further improving signal quality and coverage.

However, it has not hitherto been possible to design angular diversity systems having arbitrarily closely spaced antennas while maintaining low correlation between the beams. For example, PCT application WO 99/55012 presents a diversity system having two antennas separated by a third of a wavelength, with a 90° phase shift between the feed voltages to the two antennas for the generation of directional beams. However, no account was taken of correlation coefficients in the design of this diversity system, nor of the fact that the antennas in that system did not behave as ideal point sources, with the result that the behaviour of the system will not generally be optimum.

As an alternative to angular diversity, polarisation diversity has been used with small antenna separations. However, differences in the mean power of each polarisation cause degradation of the diversity gain. Also, there is no scope for realising coverage enhancement or delay spread improvement.

An object of the present invention is to provide an antenna diversity arrangement having improved angular diversity performance from antennas which can be arbitrarily closely spaced.

According to a first aspect of the present invention there is provided a antenna diversity arrangement comprising a plurality of antennas and means for feeding each of the plurality of antennas with a signal of suitable amplitude and phase to enable the generation of a plurality of antenna beams, wherein the correlation coefficient between any pair of beams is substantially zero.

According to a second aspect of the present invention there is provided a wireless device incorporating an antenna diversity arrangement made in accordance with the present invention.

According to a third aspect of the present invention there is provided a method of operating an antenna diversity arrangement comprising a plurality of antennas, the method comprising feeding each of the plurality of antennas with a signal of suitable amplitude and phase to enable the generation of a plurality of antenna beams, wherein the correlation coefficient between any pair of beams is substantially zero.

The present invention is based on the realisation that an angular diversity arrangement having zero envelope correlation coefficient between the antennas can readily be designed using ideal point sources of radiation separated by arbitrary distances. A practical realisation, for the same antenna separations, can then be obtained by appropriate transformations to yield the required feed voltages for an array comprising dipole, monopole, helical or other antennas. The analysis methods presented here therefore enable the design of a wide range of compact antenna diversity arrangements, taking full account of mutual interactions between the individual antennas.

Embodiments of the present invention will now be described, by way of example, with reference to the accompanying drawings, wherein.

Figure 1:
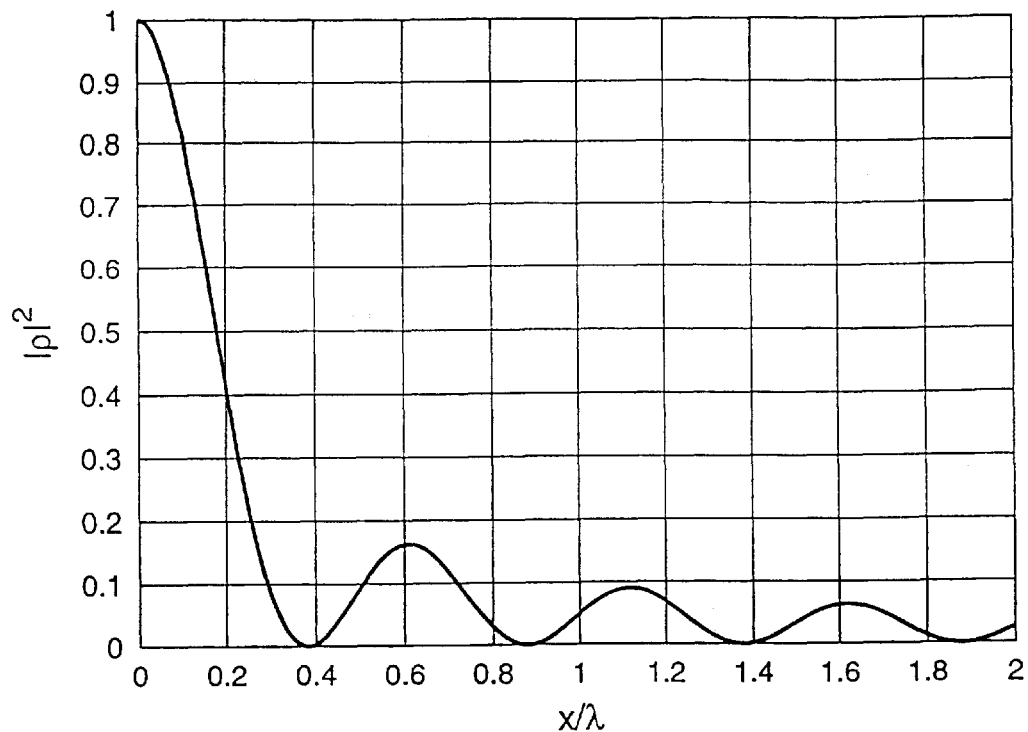
FIG. 1 is a graph showing how the auto-correlation function for the magnitude of the electric field at two points, $|\rho|^2$, varies with separation in wavelengths, $x/\lambda$ of the points.
Figure 2:
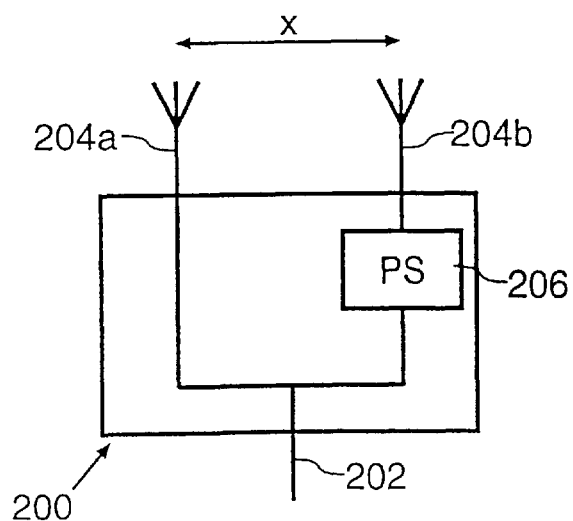
FIG. 2 is a block schematic diagram of an antenna diversity arrangement.

FIG. 2 illustrates an antenna diversity arrangement 200 which will be used to describe an embodiment of the present invention (the arrangement will behave similarly for transmission and reception, according to the principle of reciprocity). The arrangement 200 comprises an antenna feed 202 which carries the signal to be transmitted, at an appropriate frequency and power level, which signal is split and supplied to first and second antennas 204a,204b. The signal supplied to the second antenna 204b is passed through a phase shifter 206 which can shift the phase of the signal by up to ±180°, and may also adjust the amplitude of the signal if required.

The desired radiation pattern from this two-element array is a pair of identical but oppositely-directed and orthogonal beams (i.e. beams having zero or very small envelope auto-correlation coefficient $\rho_e$). Together the beams provide omni-directional coverage, while individually they receive equal powers in a typical fading environment (where all azimuth angles of arrival are, on average, equally likely).

Figure 3:
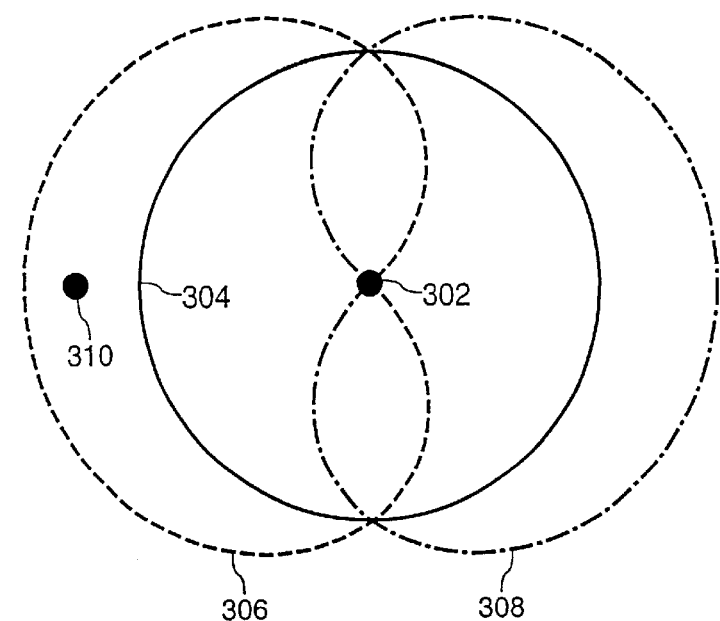
FIG. 3 shows directional coverage of two oppositely directed beams compared with an omni-directional beam.

FIG. 3 shows an example of the directional coverage from such an array. A base station 302 having an antenna diversity arrangement 200 is able to transmit and receive via an omni-directional beam 304, a first directional beam 306 (shown dashed in FIG. 3) and a second directional beam 308 (shown chain dashed in FIG. 3). Hence, a mobile station 310 which is out of range of the omni-directional beam 304 is able to communicate with the base station 302 via the first directional beam 306.

The present invention will first be described in relation to an array of two point sources of radiation, for which characteristics of gain and correlation coefficient will be determined. It will then be shown how an array having desired characteristics can be implemented with linear antennas. An example of the application of the present invention to a practical application will then be detailed.

Consider an array of point sources, all located in the horizontal plane. The far-field electric field E in the same plane is given by $$E = \sum_{n=1}^{N} A_n e^{j(\Delta_n + k d_n \cos(\phi - \phi_n))} \quad (2)$$

where $\Delta_n$ is the phase and $A_n$ is the amplitude of the $n^{th}$ feed, $d_n$ is the distance of the $n^{th}$ source from the origin, and $\phi_n$ is the angle subtended between the x axis and a line from the origin to the $n^{th}$ source.

For a two-element embodiment, consider both antennas to be located on the x axis (so that $\phi_n$=0). In the first transmission mode, the first antenna 204a is considered as the reference and the feed to the second antenna 204b has its amplitude and phase adjusted, causing a directional beam to be formed in a particular direction. In the second mode the relative amplitudes and phases are reversed, thereby causing a directional beam in the opposite direction. For simplicity it will be assumed that the antennas are fed with equal amplitudes. The radiation patterns of the two modes, $E_1$ and $E_2$ respectively, are therefore given by $$E_1 = 1 + e^{j(\Delta + kd \cos \phi)}$$

$$E_2 = e^{j\Delta} + e^{jkd \cos \phi} \quad (3)$$

where d is equal to the distance between the two antennas 204a,204b and $\Delta$ is the phase difference between the feeds of the two antennas.

To enable radiation patterns to be compared they require normalisation. The appropriate normalisation relation is the inner product of the radiation patterns, given by $$\int D d\phi = \int E E^* d\phi = 2\pi \quad (4)$$

From the expressions for $E_1$ and $E_2$ in equation 3 above, it can be determined that $$E_1 E_1^* = 2(1 + \cos(\Delta + kd \cos \phi))$$

$$E_2 E_2^* = 2(1 + \cos(\Delta - kd \cos \phi)) \quad (5)$$

Hence, it can readily be shown that $$\int E_1 E_1^* d\phi = \int E_2 E_2^* d\phi = 4\pi(1 + J_0(kd) \cos \Delta) \quad (6)$$

Hence, using equation 4, it can be seen that both $E_1$ and $E_2$ can be normalised by the factor $$\frac{1}{\sqrt{2(1 + J_0(kd) \cos \Delta)}} \quad (7)$$

Combining equations 5 and 7 gives the power gain G of the second beam (which is the same as that of the first beam but in the opposite direction) as $$G(\phi) = \frac{1 + \cos(\Delta - kd \cos \phi)}{1 + J_0(kd) \cos \Delta} \quad (8)$$

Figure 4:
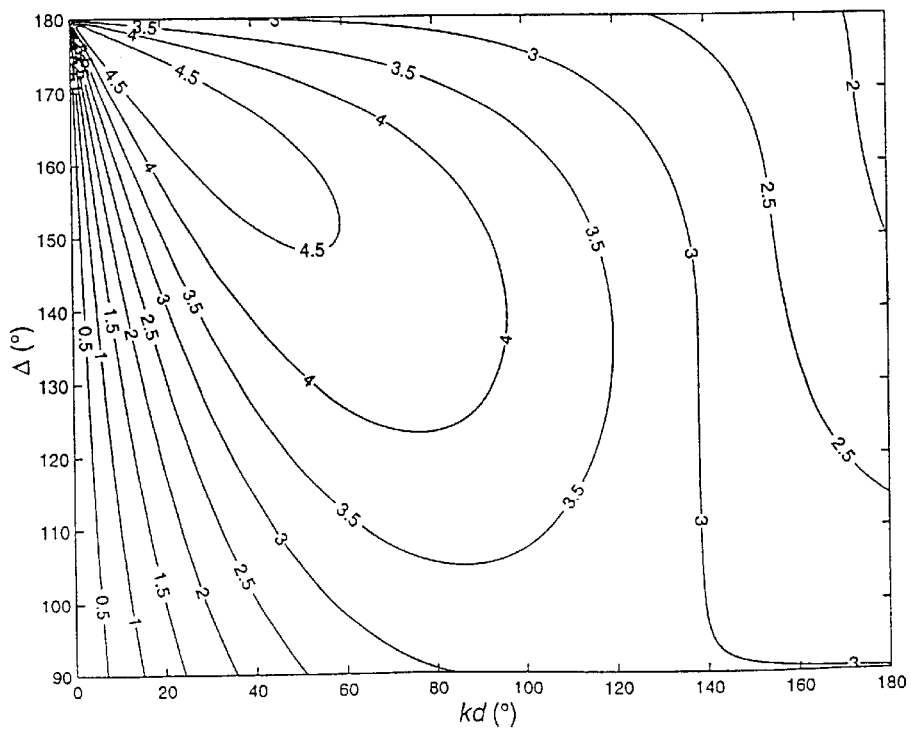
FIG. 4 is a contour plot of the relationship between the maximum gain (in dB) of a two-element antenna array and the differential phase shift $\Delta$ and electrical spacing kd of the antennas.

For $\Delta$ and kd between 0 and 180°, the maximum gain occurs at $\phi$=0 for $\Delta$>kd and at $\cos^{-1}(\Delta/kd)$ elsewhere. FIG. 4 is a contour plot showing how the maximum gain (in dB) depends on the differential phase shift $\Delta$ and electrical spacing kd of the antennas 204a,204b. This demonstrates that super-directivity is possible at very close antenna spacings.

However, it is also necessary for the beams to have a low envelope correlation coefficient $\rho_e$. For the antenna diversity arrangement 200, comprising two antennas 204a,204b in a Rayleigh fading environment, it was demonstrated in the paper by Clarke cited above that this coefficient is given by $$\rho_e = \frac{\left| \int_\Omega (E_{1\theta} E_{2\theta}^* p_\theta + X E_{1\phi} E_{2\phi}^* p_\phi) e^{-jk\Delta x} d\Omega \right|^2}{\int_\Omega (E_{1\theta} E_{1\theta}^* p_\theta + X E_{1\phi} E_{1\phi}^* p_\phi) d\Omega \int_\Omega (E_{2\theta} E_{2\theta}^* p_\theta + X E_{2\phi} E_{2\phi}^* p_\phi) d\Omega} \quad (9)$$

where:

$E_\theta$ and $E_\phi$ are the complex electric field patterns of the $\theta$ and $\phi$ polarisations respectively;

X is the cross-polar ratio $P_\phi/P_\theta$, where $P_\theta$ and $P_\phi$ are the powers that would be received by isotropic $\theta$ and $\phi$ polarised antennas respectively in a multipath environment;

$p_\theta$ and $p_\phi$ are the angular density functions (angle of arrival probability distributions) of the incoming $\theta$ and $\phi$ polarised plane waves respectively; and $\Delta x$ is the difference in distance between waves incident at the two antennas 204a,204b (a function of angle).

Although the correlation coefficient $\rho_e$ defined by equation 9 is based on reception, it simplifies to an equation that is a function of the incoming multipath and the complex radiation pattern. By reciprocity, the equation is therefore equally applicable to transmission from the antenna diversity arrangement 200.

When the two antennas 204a,204b are considered as a single antenna array, so the radiation patterns of the two antennas are referred to the same point in space, $\Delta x$=0 and equation 9 simplifies to $$\rho_e = \frac{\left| \int_\Omega E_{1\theta} E_{2\theta}^* p_\theta \, d\Omega + X \int_\Omega E_{1\phi} E_{2\phi}^* p_\phi \, d\Omega \right|^2}{\int_\Omega (|E_{1\theta}|^2 p_\theta + X|E_{1\phi}|^2 p_\phi) d\Omega \int_\Omega (|E_{2\theta}|^2 p_\theta + X|E_{2\phi}|^2 p_\phi) d\Omega} \quad (10)$$

It can clearly be seen from equations 9 and 10 that the correlation is a strong function of the orthogonality of the polarisation states of each beam, albeit weighted by the angle of arrival probability distribution. If the beams are orthogonal at all points in space, then the envelope correlation $\rho_e$ will be zero and the diversity performance will be optimised. The simplest configuration having this property is non-overlapping beams, although it is well known that orthogonality can be achieved with overlapping beams. Hence, even though the cross-polarisation and angle of arrival statistics are important parameters in determining the correlation coefficient $\rho_e$, good insight into diversity performance can be obtained by studying the beam orthogonality alone.

To evaluate the correlation coefficient $\rho_e$ using the radiation patterns defined in equations 3, it is necessary to evaluate $E_1 E^*_2$. Ignoring normalisation (since the normalising factors cancel out in equations 9 and 10), $$E_1 E_2^* = (1 + e^{j\Delta} e^{jkd \cos \phi})(e^{j\Delta} + e^{jkd \cos \phi})^* = 2(\cos \Delta + \cos(kd \cos \phi)) \quad (11)$$

Integrating this expression over the xy plane, $$\int E_1 E_2^* d\phi = 2\left( \int_0^{2\pi} \cos\Delta \, d\phi + \int_0^{2\pi} \cos(kd\cos\phi) d\phi \right) = 4\pi(\cos\Delta + J_0(kd)) \quad (12)$$

Assuming vertical polarisation alone from the point sources, so that $E_{1\phi} = E_{2\phi} = 0$, and a uniform angle of arrival probability distribution (so that $p_\theta$ is a constant), the envelope correlation coefficient $\rho_e$ is obtained from equations 10, 12 and 6 as $$\rho_e = \left( \frac{\cos\Delta + J_0(kd)}{1 + J_0(kd)\cos\Delta} \right)^2 \quad (13)$$

Figure 5:
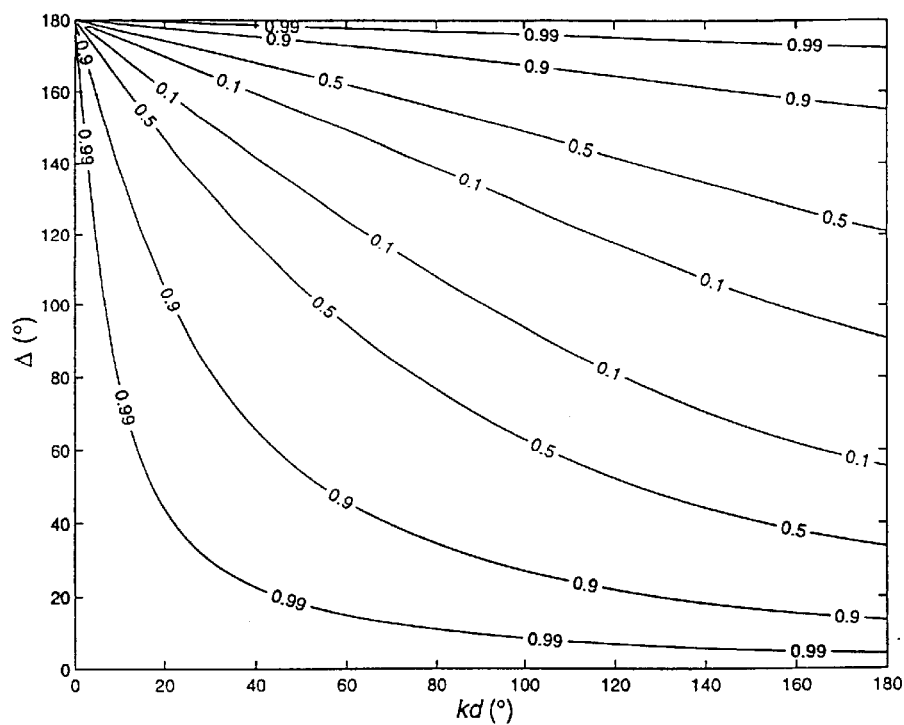
FIG. 5 is a contour plot of the relationship between the envelope correlation coefficient of a two-element antenna array and the differential phase shift $\Delta$ and electrical spacing kd of the antennas.

FIG. 5 is a contour plot showing how the envelope correlation coefficient $\rho_e$ depends on the differential phase shift $\Delta$ and electrical spacing kd of the antennas. It can clearly be seen that there is a significant region of very low $\rho_e$, with $\rho_e = 0$ when $\Delta = \cos^{-1}(-J_0(kd))$.

Figure 6:
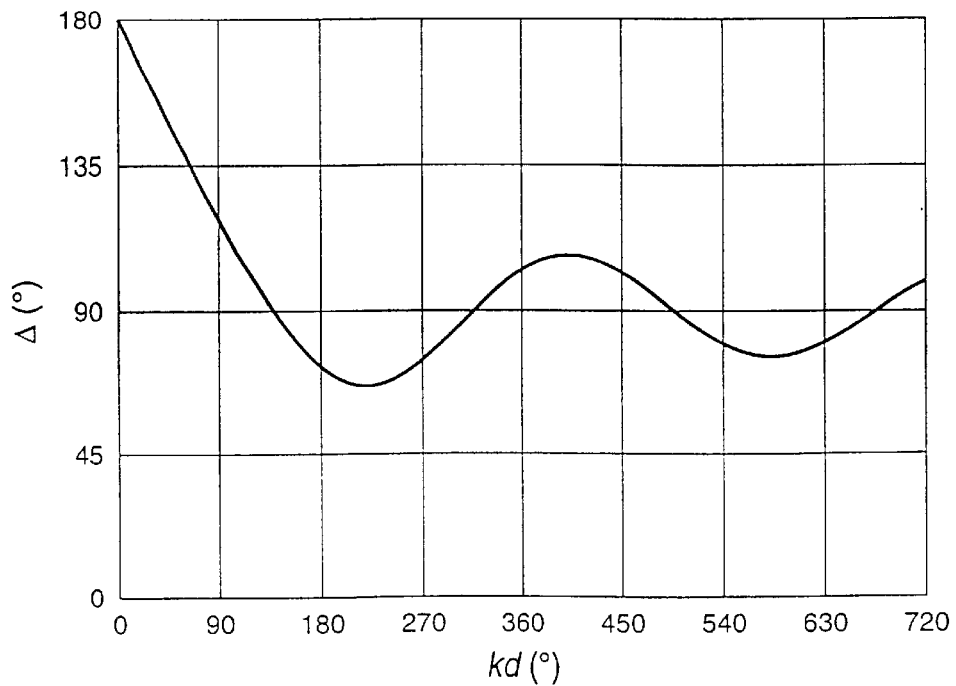
FIG. 6 is a graph showing the values of the differential phase shift $\Delta$ and electrical spacing kd of two point sources which result in zero correlation between two beams.

It is possible to obtain completely decorrelated beams for antenna spacings down to zero (at least theoretically). FIG. 6 is a graph showing the values of differential phase shift $\Delta$ and electrical spacing kd which result in $\rho_e = 0$, covering a wider range of electrical spacings than shown in FIG. 5. It can be seen that as the antenna separation is reduced the required phase shift $\Delta$ tends towards 180°, while for electrical separations of greater than 120° there is a channel of low correlation coefficient when the mean phase difference $\Delta$ between the feeds is approximately 90°.

It can be seen, by comparing FIGS. 4 and 5, that the conditions for orthogonal beams, low correlation and high gain are all consistent with each other. This is to be expected, since these conditions can broadly be summarised as minimum overlap between radiation patterns.

The derivation above related to idealised point sources of radiation rather than practical antennas. It will now be demonstrated how similar results can be obtained from vertically-orientated linear antennas, for example monopoles, dipoles or helices. The analysis here is adapted from that commonly used for AM broadcast antennas, see for example *Matrix Method for Relating Base Current Ratios to Field Ratios of AM Directional Stations*, J. M. Westberg, IEEE Transactions on Broadcasting, Volume 35 No. 2, pages 172 to 175.

Consider a two-element antenna array 200. The voltages V and currents I at the feed points of each element of the array are related from simple circuit theory by $$I_1 = V_1 Y_{11} + V_2 Y_{12}$$

$$I_2 = V_1 Y_{21} + V_2 Y_{22} \quad (14)$$

The far field radiation in the horizontal plane from a vertically-orientated linear element is given by $$E_{\theta z} = -j \frac{\eta k}{4\pi r} e^{-jkr} \int I_z(z) dz \quad (15)$$

where $\eta$ is the impedance of free space, r is the radial distance from the centre of the element, and $I_z(z)$ is the current distribution on the antenna 204a,204b (which is assumed to be linear in the z direction).

For an array comprising a plurality of antennas 204a, 204b, the radiation from each antenna can be written as $$E_n = K \int I_{zn}(z) dz \quad (16)$$

where K represents the factor before the integral in equation 15, the subscript n represents the $n^{th}$ element and $I_{zn}(z)$ is the elemental current along the length of the $n^{th}$ element.

Because antennas are linear systems, where the field at a particular point in space is proportional to the input voltage or current, equation 16 can be written as $$E_n = C_n I_n \quad (17)$$

where $I_n$ is the feed current of the $n^{th}$ element. Substitution of equations 17 and 16 into equation 14 then gives $$\frac{K}{C_1} \int I_{z1}(z) dz = V_1 Y_{11} + V_2 Y_{12} \quad (18)$$

$$\frac{K}{C_2} \int I_{z2}(z) dz = V_1 Y_{21} + V_2 Y_{22}$$

which can be rearranged to $$\int I_{z1}(z) dz = \frac{C_1}{K} V_1 Y_{11} + \frac{C_1}{K} V_2 Y_{12} \quad (19)$$

$$\int I_{z2}(z) dz = \frac{C_2}{K} V_1 Y_{21} + \frac{C_2}{K} V_2 Y_{22}$$

This equation can be simplified further by making substitutions of the type $$T_{11} = \frac{C_1}{K} Y_{11} \quad (20)$$

which can be written (using equation 14) as $$T_{11} = \frac{C_1}{K} \cdot \frac{I_1}{V_1} \bigg|_{V_2 = 0} \quad (21)$$

From equation 19 it can be seen that, by setting $V_2=0$ and $V_1$ to 1V, this is equivalent to $$T_{11}=\int I_{z1}(z)dz|_{V_2=0} \quad (22)$$

In a similar manner, a complete set of T matrix equations can be defined:

$$T_{11} = \frac{C_1}{K}Y_{11} \int I_{z1}(z)\,dz \bigg|_{V_1=1, V_2=0}$$

$$T_{12} = \frac{C_1}{K}Y_{12} \int I_{z1}(z)\,dz \bigg|_{V_1=0, V_2=1} \quad (23)$$

$$T_{21} = \frac{C_2}{K}Y_{21} \int I_{z2}(z)\,dz \bigg|_{V_1=1, V_2=0}$$

$$T_{22} = \frac{C_2}{K}Y_{22} \int I_{z2}(z)\,dz \bigg|_{V_1=0, V_2=1}$$

Each term in the above equation represents an integral equivalent to a term in the admittance matrix Y of equation 14. From equations 16, 19 and 23, the electric fields are given in terms of the voltages and the T parameters as $$\frac{E_1}{K} = T_{11}V_1 + T_{12}V_2 \quad (24)$$

$$\frac{E_2}{K} = T_{21}V_1 + T_{22}V_2$$

The constant factor K can be ignored, since it is only the relative amplitudes of the fields that are of concern for determining the radiation pattern. The above equations can then be written in matrix form as $$[E]=[T][V] \quad (25)$$

This equation can be normalised further such that one of the E field values is unity, again without altering the required result. For point sources, the [E] matrix represents the field ratios, or relative currents fed to each element.

All the parameters in equation 25 are complex. The equation provides a relationship between the current amplitudes and phases of point sources (field ratios) and the complex voltages necessary to produce the same response from a linear array 200. To evaluate this relation it is necessary to compute the complex integral of the current distribution on each element when the other element is short-circuited, thereby obtaining the [T] matrix. In practice this can readily be done using a standard computer program, for example the well-known NEC (Numerical Electromagnetics Code) or the High Frequency Structure Simulator (HFSS) available from Ansoft Corporation.

Once the [T] matrix has been found it can be inverted to obtain the required voltages, from the equation $$[V]=[T]^{-1}[E] \quad (26)$$

The analysis above shows how the field ratios determined from a point source analysis can be replicated in a vertically-orientated linear array 200. This enables the horizontal radiation patterns of a linear array to be synthesised in a straightforward manner using a point source analysis, and enabling near-zero correlation from antennas having a spacing much closer than is possible by simple application of Clarke's spatial correlation formula.

One further aspect of the use of linear antennas requires attention. In the derivation of the gain and envelope correlation coefficient above, only the horizontal radiation patterns were considered.

For vertically-orientated elements, such as those considered above, the radiation pattern can be obtained by straightforward pattern multiplication as $$E_1 = E_1(\phi)E_1(\theta) \quad (27)$$

which is sufficient to enable the gain to be calculated. For the correlation coefficient $\rho_e$, because of the pure vertical polarisation, equation 10 can be written as $$\rho_e = \frac{\left|\int_\Omega E_{1\theta}E_{2\theta}^* p_\theta \, d\Omega\right|^2}{\int_\Omega E_{1\theta}E_{1\theta}^* p_\theta \, d\Omega \int_\Omega E_{2\theta}E_{2\theta}^* p_\theta \, d\Omega} \quad (28)$$

Substitution of equation 27 into equation 28 gives rise to terms of the type $$\int_\Omega E_1(\phi)E_1(\theta)E_2^*(\phi)E_2^*(\theta)p(\theta,\phi)\sin\theta\,d\theta\,d\phi \quad (29)$$

If the angle of arrival probabilities in $\theta$ and $\phi$ can be considered independent, which in practice is a realistic assumption, this equation simplifies to $$\int_\phi E_1(\phi)E_2^*(\phi)p(\phi)\,d\phi \int_\theta E_1(\theta)E_2^*(\theta)p(\theta)\sin\theta\,d\theta \quad (30)$$

Further, if $E_1(\theta)=E_2(\theta)$, i.e. if the elements are the same, the $\theta$ dependence cancels out on substitution in equation 28. Under such circumstances, the envelope correlation coefficient $\rho_e$ is independent of the vertical radiation patterns.

The theoretical analysis above will now be applied to a practical example. Consider two half wave dipoles 204a, 204b separated by 3.966 cm (electrically 90° or a quarter of a wavelength at 1890 MHz), and phased to provide oppositely-directed beams. It can be seen from FIG. 6 that the appropriate spacing for decorrelated beams at this spacing is 125°, i.e. the elements have field ratios (or equivalent point source currents) of $$E_1=1\angle 0$$

$$E_2=1\angle 125 \quad (31)$$

Figure 7:
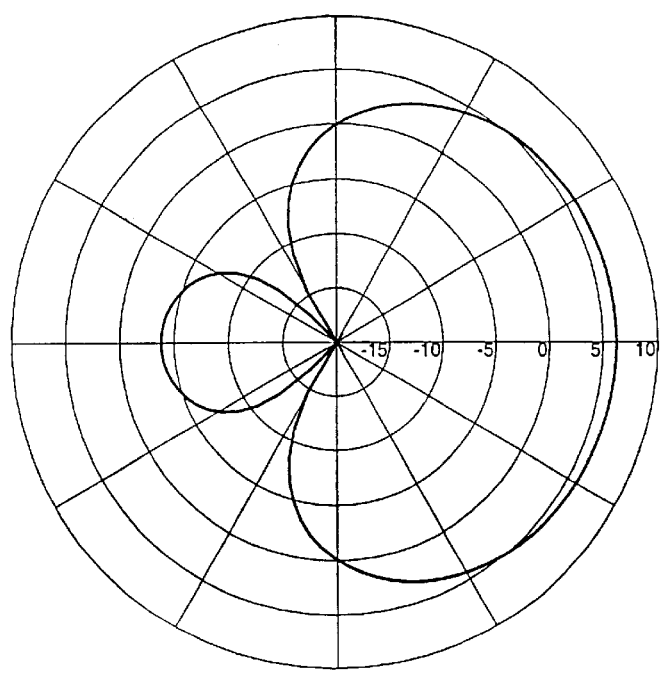
FIG. 7 shows an azimuthal radiation pattern for a point source array of two elements at 1890 MHz.

It can also be seen from FIG. 4 that the expected gain in the horizontal plane is approximately 4 dB. Combined with the dipole gain of 2.2 dB, a total gain of 6.2 dB (relative to an isotropic radiator) can be expected. The normalised point source radiation pattern produced by this combination, given by equation 8, is shown in FIG. 7. In this figure, the direction $\phi=0$ corresponds to the direction of the positive x axis, and the magnitude of the radiation in a particular direction is in dB relative to an isotropic radiator.

It is now required to replicate this pattern using the two dipoles 204a, 204b. The first step is to run a program, such as NEC or HFSS, as many times as there are sources, with 1V applied to the source in question and all the other sources shorted. For each run the currents on each radiator should be integrated (achieved in NEC by adding real and imaginary components for each equal length segment), giving the elements of the [T] matrix.

For two 1 mm diameter half wavelength dipoles 204a, 204b, separated by a quarter of a wavelength at a frequency of 1890 MHz, such simulations show that $$T_{11}=9.84-j9.64=T_{22}$$

$$T_{12}=3.02+j6.99=T_{21} \quad (32)$$

Now that [E] and [T] are known, the dipole feed voltages can be found, using equation 26, as $V_1 = 47.30 - j65.68$ $V_2 = -28.09 + j1.98$ (33)

Note that the normalised voltage ratio, of $0.35\angle 130$, is very different from the field ratio, of $1\angle 125$.

Figure 8:
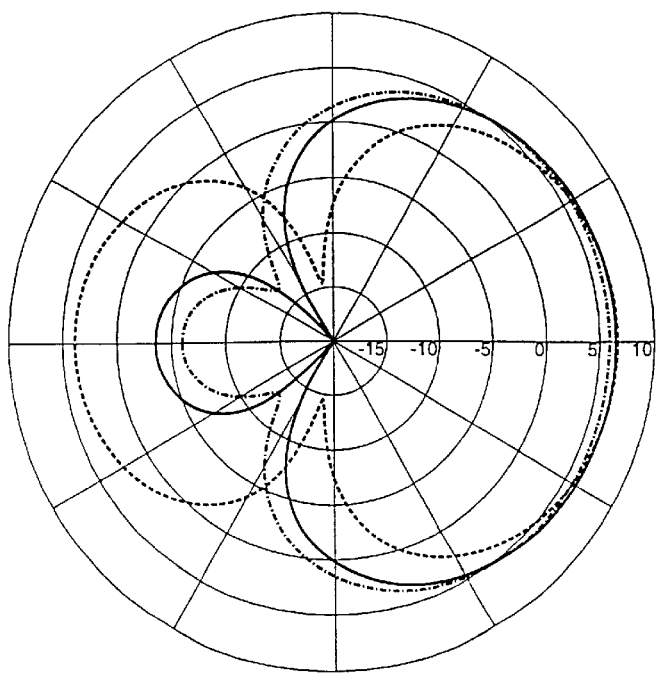
FIG. 8 shows azimuthal radiation patterns for an array of two linear dipole elements, with both elements fed, at 1700 MHz (dashed), 1890 MHz (solid) and 2080 MHz (chain dashed)

Using these voltages as the feeds for the dipole elements 204a,204b gives the radiation pattern shown in FIG. 8 (generated from NEC). The radiation patterns are also shown at 1700 MHz (dashed) and 2080 MHz (chain dashed) to show the radiation pattern variation over a 20% fractional bandwidth. This demonstrates that reasonable bandwidth can be achieved in an antenna diversity arrangement made according to the present invention.

The radiation pattern at 1890 MHz, shown by the solid curve in FIG. 8, corresponds closely to that in FIG. 7, generated by simple point source theory.

The impedances of the two antenna elements were found to be $Z_1 = 106.6 + j115.8$ $V_2 = 32.8 + j37.1$ (34)

Figure 9:
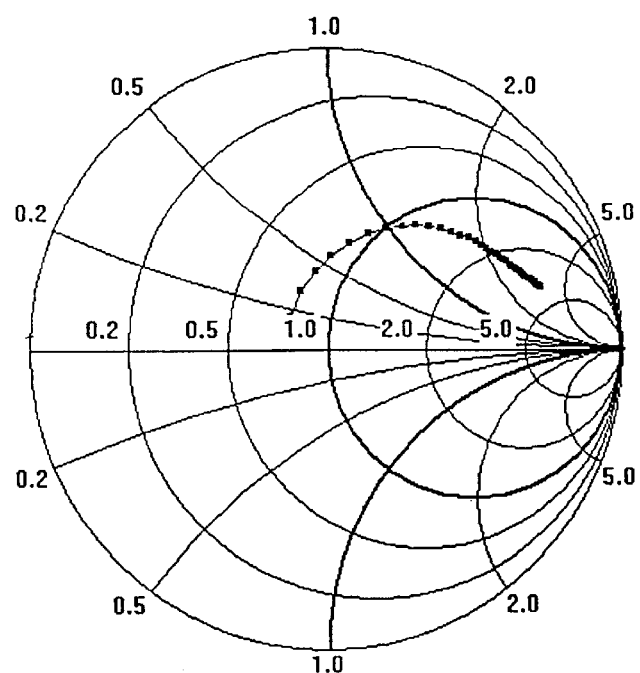
FIG. 9 is a Smith chart showing the impedance of one antenna of an array of two linear dipoles over the frequency range 1700 to 2080 MHz.

These impedances should be taken into account in the design of any power splitting and phasing circuitry 206. FIG. 9 is a Smith chart showing the impedance of the first antenna 204a over a 20% bandwidth (i.e. 1700 to 2080 MHz), which demonstrates that such an array can potentially have a very good bandwidth.

The description above has shown that the radiation patterns and correlation of vertically orientated linear antennas can be simulated using point sources and then realised in practice via a numerical transform. However, so far it has been necessary for all the antennas to be fed.

In many cases a good approximation to the patterns with all antennas fed can be obtained by the use of parasitic elements. Impedances with low real values can often be replaced effectively by (lossless) parasitic reactances that are conjugate to the reactive part of the impedance. Near correct feed voltages are then set up by mutual interactions between the antennas.

Figure 10:
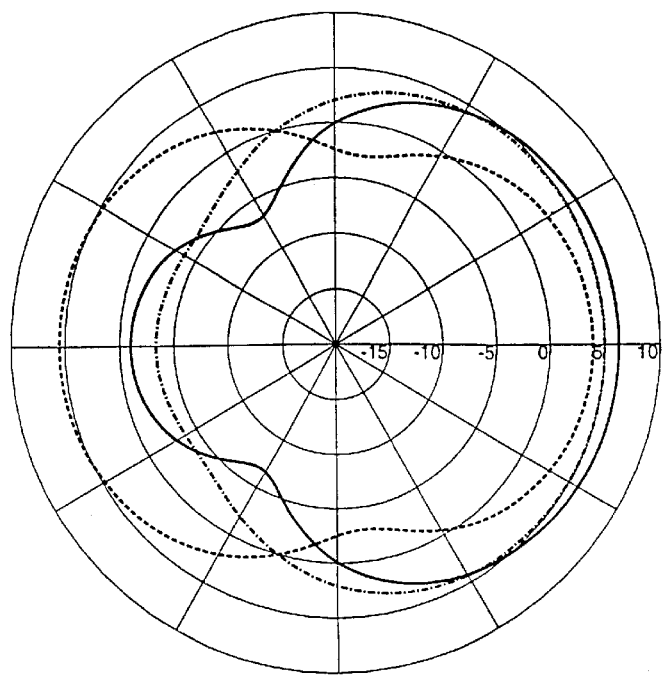
FIG. 10 shows azimuthal radiation patterns for an array of two linear dipole elements, with one element loaded by a parasitic reactance, at 1700 MHz (dashed), 1890 MHz (solid) and 2080 MHz (chain dashed).

Using the same example as above, this principle can be illustrated by replacing the feed to the second antenna element 204b with a parasitic reactance of −37.1 Ohms. The resulting radiation patterns (with the lines having the same meanings as in FIG. 8, are shown in FIG. 10. Even though the second element 204b did not meet the criterion of having a low real impedance (compared to its reactance), the radiation patterns are in reasonable agreement with those of FIG. 8. In practice it has been found that varying the parasitic reactance around the complex conjugate of the fed reactance can often result in better radiation patterns.

The description above has concentrated on the provision of directional antenna patterns from an array 200. However, omni-directional operational modes can also be provided in the same way, by setting the point source contribution of an unused antenna to zero and performing the transformation. This will give feed voltages that result in no radiation from one of the elements. Parasitic loading can then be used to avoid the need to feed the unused antenna.

Although the present invention has been described in relation to linear electric antennas 204a,204b it is applicable to any antenna which can be linearised. For example, it would be possible to use the above methods to analyse the θ radiation from a sloping antenna. The terms "horizontal" and "vertical" have been employed in the description because many radio communication systems employ vertical antennas 204a,204b to generate vertically polarised radiation. However, in general the term "vertical" should be understood to mean a direction parallel to the intended polarisation direction of the radiation, while the term "horizontal" should be understood to mean a direction perpendicular to the intended polarisation direction.

Although the description above related to an antenna diversity arrangement 200 having two antennas 204a,204b, it will be apparent to the skilled person that it is equally applicable to arrangements having more antennas.

From reading the present disclosure, other modifications will be apparent to persons skilled in the art. Such modifications may involve other features which are already known in the design, manufacture and use of antenna diversity arrangements, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. An antenna diversity arrangement comprising a plurality of antennas and means for feeding each of the plurality of antennas with a signal of suitable amplitude and phase to enable the generation of a plurality of antenna beams having a correlation coefficient determined by a differential phase shift in the signal for each of the antennas and an electrical spacing between the antennas, wherein the correlation coefficient between any pair of beams is substantially zero.

2. An arrangement as claimed in claim 1, characterized in that the amplitude and phase of the signal feeding each antenna is predetermined.

3. An arrangement as claimed in claim 1 characterized in that the amplitudes of all the feed signals are substantially equal.

4. A wireless device incorporating an antenna diversity arrangement as claimed in claim 3.

5. An arrangement as claimed in claims 1, characterized in that the diversity arrangement comprises two antennas.

6. An arrangement as claimed in claim 5, characterized in that the phase difference between the feed signals of an equivalent point source antenna diversity arrangement is substantially equal to $\cos^{-1}(-J_0(kd))$, where kd is the electrical spacing of the antennas.

7. A wireless device incorporating an antenna diversity arrangement as claimed in claim 6.

8. A wireless device incorporating an antenna diversity arrangement as claimed in claim 5.

9. A wireless device incorporating an antenna diversity arrangement as claimed in claim 1.

10. An arrangement as claimed in claim 1 wherein each of the plurality of antennas provides a directional beam.

11. An arrangement as claimed in claim 10 wherein each of the directional beams is in a different direction.

12. A method of operating an antenna diversity arrangement comprising a plurality of antennas, the method comprising feeding each of the plurality of antennas with a signal of suitable amplitude and phase to enable the generation of a plurality of antenna beams, having a correlation coefficient determined by a differential phase shift in the signal for each of the antennas and an electrical spacing between the antennas, wherein the correlation coefficient between any pair of beams is substantially zero.

13. A method as claimed in claim 12, characterized by the amplitude and phase of the signal feeding each antenna being predetermined.

14. A method as claimed in claim 12, characterized by the amplitudes of all the feed signals being substantially equal.

15. A method as claimed in claims 12, characterized by the diversity arrangement comprising two antennas and by the phase difference between the feed signals of an equivalent point source antenna diversity arrangement being substantially equal to $\cos^{-1}(-J_0(kd))$, where kd is the electrical spacing of the antennas.

16. A method as claimed in claim 12, characterized in that each of the plurality of antennas provides a directional beam.

17. A method as claimed in claim 16, characterized in that each of the directional beams is in a different direction.

18. An antenna diversity arrangement comprising:

a plurality of antennas; and a mechanism for providing each of the plurality of antennas with a signal having a correlation coefficient determined by a differential phase shift in the signal for each of the antennas and an electrical spacing between the antennas, wherein the correlation coefficient between any pair of beams is substantially zero.

19. An arrangement as claimed in claim 18 wherein each of the plurality of antennas provides a directional beam, wherein each of the directional beams is in a different direction.

20. An arrangement as claimed in claim 18, wherein the phase difference between the signals of an equivalent point source antenna diversity arrangement is substantially equal to $\cos^{-1}(-J_0(kd))$, where kd is the electrical spacing of the antennas.

* * * * *